United States Patent
Shieh et al.

(10) Patent No.: US 6,435,244 B1
(45) Date of Patent: Aug. 20, 2002

(54) APPARATUS FOR COVERING A METAL ROLL CORE WITH A POLYMERIC MATERIAL, PREFERABLY A HIGH PERFORMANCE THERMOPLASTIC MATERIAL

(75) Inventors: Yang T. Shieh, Wallingford, PA (US); Jose J. A. Rodal, Davidson, NC (US); Erik Vaaler, Redwood City, CA (US)

(73) Assignee: Advanced Materials Corporation, Lester, PA (US)

( * ) Notice: Subject to any disclaimer, the term of this patent is extended or adjusted under 35 U.S.C. 154(b) by 112 days.

(21) Appl. No.: 09/723,448

(22) Filed: Nov. 28, 2000

Related U.S. Application Data

(62) Division of application No. 09/362,430, filed on Jul. 28, 1999, now Pat. No. 6,206,994.

(51) Int. Cl.⁷ ............................................. B65H 81/08
(52) U.S. Cl. ...................... 156/425; 156/431; 156/500
(58) Field of Search ................................. 156/171, 172, 156/185, 187, 188, 190, 191, 192, 195, 244.12, 244.13, 244.26, 500, 425, 430, 431; 29/895.211; 425/14, 412

(56) References Cited

U.S. PATENT DOCUMENTS

| 3,437,032 A | 4/1969 | Manghirmalani et al. |
| 3,599,306 A | 8/1971 | Brafford |

(List continued on next page.)

FOREIGN PATENT DOCUMENTS

| JP | 1-260092 | 10/1989 |
| WO | WO 94/09208 | 4/1994 |
| WO | WO 95/17298 | 6/1995 |

Primary Examiner—Michael W. Ball
Assistant Examiner—Barbara J Musser
(74) Attorney, Agent, or Firm—Caesar, Rivise, Bernstein, Cohen & Pokotilow, Ltd.

(57) ABSTRACT

A method and apparatus for covering a roll core with a polymeric material, preferably a high performance thermoplastic material, is disclosed. The method includes first providing a cylindrical roll core having two ends, a length, and an outer surface. A spacer assembly is attached proximate one end of the roll core, the spacer assembly having a circumference greater than that of the roll core. After preheating to a desired temperature, the roll core is then placed within an apparatus in a substantially vertical orientation and held therein by suitable fixtures, e.g., opposed universal chucks. A length of mold tape is helically wound over the length of the roll core in a spaced-apart relationship therewith to define an application zone between the mold tape and the roll core outer surface. A filament formed of the polymeric material is extruded within the application zone and helically wound over the roll core outer surface so that the roll core is covered with the material. Localized heating is applied to the roll core surface just prior to the application of the filament to improve bonding to the roll core surface. The mold tape acts as a supportive form to prevent sagging of the extruded material prior to solidifying. The wound extruded material is allowed to solidify in a temperature controlled manner to be hardened to form a continuous layer over the length of the roll core. Finally, the mold tape is removed. The resulting covered roll fabricated in accordance with this method has minimal residual stresses and a has a higher tensile strength, compression strength and impact strength. The resulting covered roll also has a glass transition temperature, greater durability, more suitable Young's modulus, and a longer lifespan than prior art covered rolls. The covered roll fabricated in accordance with this method also performs consistently under extremely high pressures, high heating conditions and high speed conditions.

43 Claims, 10 Drawing Sheets

U.S. PATENT DOCUMENTS

| | | |
|---|---|---|
| 3,616,070 A | 10/1971 | Lemelson |
| 3,622,412 A | 11/1971 | Ross |
| 3,684,602 A | 8/1972 | Ball |
| 3,707,752 A | 1/1973 | Brafford et al. |
| 3,730,794 A | 5/1973 | Ross |
| 3,800,381 A | 4/1974 | Brafford |
| 3,883,384 A | 5/1975 | Hopkins |
| 4,242,783 A | 1/1981 | Watanabe et al. |
| 4,258,089 A | 3/1981 | Anderson et al. |
| 4,288,058 A | 9/1981 | Inman |
| 4,309,803 A | 1/1982 | Blaszak |
| 4,368,568 A | 1/1983 | Watanabe |
| 4,466,164 A | 8/1984 | Tadokoro et al. |
| 4,472,335 A | 9/1984 | Meyer et al. |
| 4,559,095 A | 12/1985 | Babbin |
| 4,576,845 A | 3/1986 | Krotchko |
| 4,705,711 A | 11/1987 | Perna |
| 4,707,408 A | 11/1987 | Iwasawa et al. |
| 4,760,232 A | 7/1988 | Smith |
| 4,920,623 A | 5/1990 | Neuhoffer et al. |
| 5,014,406 A | 5/1991 | Kato et al. |
| 5,091,027 A | 2/1992 | Watanabe |
| 5,257,966 A | 11/1993 | Watanabe et al. |
| 5,319,430 A | 6/1994 | DeBolt et al. |
| 5,324,248 A | 6/1994 | Quigley |
| 5,334,124 A | 8/1994 | Ohno |
| 5,376,448 A | 12/1994 | Suzuki et al. |
| 5,387,172 A | 2/1995 | Habenicht et al. |
| 5,468,531 A | 11/1995 | Kikukawa et al. |
| 5,549,154 A | 8/1996 | Niskanen et al. |
| 5,571,066 A | 11/1996 | Kayser |
| 5,597,652 A | 1/1997 | Utsunomiya et al. |
| 5,601,920 A | 2/1997 | Paasonen et al. |
| 5,633,075 A | 5/1997 | Park et al. |
| 5,639,549 A | 6/1997 | Fukunaga et al. |
| 5,655,444 A | 8/1997 | Kayser et al. |
| 5,694,734 A | 12/1997 | Cercone et al. |
| 5,723,214 A | 3/1998 | Yamazaki et al. |
| 5,746,124 A | 5/1998 | Kayser |
| 5,780,131 A | 7/1998 | Paasonen et al. |
| 5,785,636 A | 7/1998 | Bonander et al. |
| 5,789,078 A | 8/1998 | Elkleberry et al. |
| 5,958,533 A | 9/1999 | Paasonen et al. |

APPARATUS FOR COVERING A METAL ROLL CORE WITH A POLYMERIC MATERIAL, PREFERABLY A HIGH PERFORMANCE THERMOPLASTIC MATERIAL

RELATED APPLICATIONS

This application is a Divisional of co-pending application Ser. No. 09/362,430, filed Jul. 28, 1999, entitled Method And Apparatus For Covering A Metal Roll Core With A Polymeric Material, Preferably A High Performance Thermoplastic Material, the disclosure of which is incorporated by reference herein. Now U.S. Pat. No. 6,206,994.

SPECIFICATION

BACKGROUND OF THE INVENTION

The invention relates to a method and apparatus for covering a metal roll core with a polymeric material such as a high performance thermoplastic material. However, the present invention is not limited to the use of high performance thermoplastic materials and contemplates the use of other extrudable elastomers such as rubbers or processable urethanes, and high viscosity thermoset resins such as polyurethanes and epoxies in general. These covered rolls are utilized in many applications including an application known as calendering. Calendering is the act of pressing a material, e.g., cloth, rubber or paper, between rollers or plates in order to smooth or glaze or to thin into sheets. The covered rolls that are discussed in this application are also known as calender rolls, soft-nip calender rolls and super-calender rolls and are often utilized in industrial environments such as paper mills. However, the invention described herein is not limited to covered rolls known by these names or utilized in these environments.

In a typical paper mill, large numbers of rolls are used not only for transporting the web sheet which becomes paper, but also for calendering or processing the web sheet into a specific grade of paper. The finished paper product must possess certain quality characteristics such as a high degree of caliper uniformity, bulk uniformity, smoothness, gloss and printability. In order to achieve these quality characteristics, it is necessary that the calender roll be precisely manufactured utilizing materials that can withstand severe conditions during paper processing.

For example, when used for transporting the web sheet, it is essential that these covered rolls provide traction to enable the transport of the paper during processing. Additionally, these rolls must be wear and corrosion resistant. During use for calendering, these covered rolls are subjected to high dynamic stress, heat, speed, abrasion and impact and therefore must be fabricated to withstand these elements. In order to function properly for these specific uses, the covered rolls must have an appropriate surface hardness based upon the intended application for the covered roll and also have a high thermal resistance to withstand high temperatures and pressures in the environments in which they are employed. Regardless of their application, these covered rolls are precision elements of the systems in which they are utilized and therefore must be precisely manufactured to achieve balance, specific size and shape specifications, surface characteristics and tight tolerances. The covered rolls have similar transporting and calendering functions in the textile industry as well as in facilities where magnetic tape is manufactured.

Conventional prior art calender rolls comprise a metal cylinder to which either a cotton-filler or a thermoset composite layer (or layers) is added to preclude metal-to-web-to-metal contact at the nip between the calender rolls during the calendering operation. Though cotton-filled roll covers have been used for a long time there are several drawbacks associated with their use such as the need for frequent regrinding. Moreover, cotton filler material is not sufficiently tough to withstand the high stress and high temperatures associated with demanding applications such as in modem paper fabrication. Paper mills must frequently regrind and replace cotton-filled roll covers, even when they perform well. This results in significant production down-time and higher costs associated with keeping replacement rolls in inventory.

Over the last two or three decades, synthetic composite roll covers have been developed to resolve many of the problems associated with cotton-filled roll covers. Most of these synthetic composite roll covers use some form of thermoset resin such as epoxy, rubber or polyurethane among others, as a base material which is combined with some form of reinforcement material to improve strength.

As an example, a synthetic composite roll cover is formed of a single layer of a reinforcement fiber mat that is impregnated with a thermoset epoxy which is then cured. The surface of the cured single layer is then machined to a smooth finish in accordance with customer specifications.

Alternatively, rather than machining the cured single layer to a smooth finish, an additional layer of reinforcement fiber mat may be added over the cured single layer, the additional layer being impregnated with an epoxy which is then cured to form a top layer. The surface of the cured top layer, which provides the outer surface of the roll is then machined to a smooth finish in accordance with customer specifications. The single layer, which forms an under layer, provides a transitional element between the metal core and the top layer to assist in establishing an effective bond and stress distribution between the two layers of the covered roll. Alternatively, additional layers could be added.

In practice, a layer of the synthetic composite cover is added to the roll core by unspooling a strip of dry reinforcement fiber mat, several inches in width, from a reel and conveying the unspooled strip through an epoxy bath. The roll core is oriented horizontally and rotated to wind the epoxy impregnated strip onto the roll core in a back and forth fashion to form a helix. The epoxy is then allowed to cure to form a layer which is then machined to a smooth finish.

The use of these synthetic composite roll covers has increased dramatically in the last ten years because of their superior performance characteristics over conventional cotton-filled roll covers. The acceptance and usage of synthetic composite roll covers in the paper industry has resulted in the beginning of the demise of the cotton-filled roll cover. Notwithstanding their superiority over cotton-filled roll covers, synthetic composites such as thermosetting epoxies also suffer from several drawbacks. For example, to formulate a synthetic composite roll cover having certain desirable properties such as high toughness, high temperature capability (glass transition temperature ($T_g$)), it is usually necessary to employ a higher concentration of reinforcement fibers. Increasing the concentration of reinforcement fibers in this manner can result in the emergence of other less desirable properties such as unacceptable surface finish, easier delamination, greater brittleness, and poor bonding between the cover and the metal outer surface of the roll core. Roll manufacturers struggle to optimize these conflicting properties to achieve a superior roll cover. Failure and inconsistent performance of the synthetic composite roll covers in the field have been and continue to be a common problem. Even with recent advances in resin chemistry, synthetic composite roll covers are best performing at operating conditions wherein the maximum operating temperature does not considerably exceed 250° F., the maximum nip pressure does not considerably exceed 10,000 p.s.i., and wherein the surface roughness of the cover is considerably less than 10 Ra micro-inches.

The method and apparatus of the present invention enables the fabrication of rolls covered with synthetic composite materials such as those discussed above. The method and apparatus of the present invention also enables the fabrication of rolls covered with high performance or engineered thermoplastic materials. Some thermoplastic materials have a number of highly desirable properties making them superior to synthetic composite materials being utilized today in the fabrication of covered roll cores. This includes a higher glass transition temperature, a more suitable Young's modulus for many applications, a higher tensile strength, greater smoothness, a higher impact strength, more uniform surface finish and more homogenous physical and thermal properties. Thus, a roll core covered with a high performance thermoplastic material will achieve superior performance characteristics than one covered with a synthetic composite material such as thermosetting epoxy resin.

OBJECTS OF THE INVENTION

Accordingly, it is a general object of this invention to provide a method and apparatus for covering a roll core with an outer layer material that overcomes the disadvantages of prior art cover materials.

It is a further object of this invention to provide a method and apparatus for covering a roll core with a thermoplastic material as the outer layer.

It is a further object of this invention to provide a method and apparatus for covering a roll core with a synthetic composite material as the outer layer.

It is a further object of this invention to provide a method and apparatus for covering a roll core with a thermoplastic material which prevents sagging of the thermoplastic material prior to solidifying.

It is a further object of this invention to provide a method and apparatus for covering a roll core wherein the cover has minimal residual stresses.

It is a further object of this invention to provide a method and apparatus for covering a roll core wherein the cover effectively adheres to the metal outer surface of the roll core it covers.

It is a further object of this invention to provide a method and apparatus for covering a roll core that results in a polymeric covering having a high tensile strength.

It is a further object of this invention to provide a method and apparatus for covering a roll core that results in a polymeric covering having a more suitable Young's modulus.

It is a further object of this invention to provide a method and apparatus for covering a roll core wherein the cover has a high glass transition temperature.

It is a further object of this invention to provide a method and apparatus for covering a roll core wherein the cover has a high durability and long lifespan.

It is a further object of this invention to provide a method and apparatus for covering a roll core that is less expensive than prior art methods and devices.

It is a further object of this invention to provide a method and apparatus for covering a roll core wherein the roll core is oriented vertically within the apparatus rather than horizontally during the application of the cover.

It is a further object of this invention to provide a method and apparatus for covering a roll core wherein the cover has an outer surface that is smoother than prior art covers formed of thermosetting materials such as epoxy resins.

It is a further object of this invention to provide a method and apparatus for covering a roll core that results in a cover that performs consistently under extremely high pressures, high heating conditions and high speed conditions.

It is a further object of this invention to provide a method and apparatus for covering a roll core wherein the cover has a high compression strength.

It is a further object of this invention to provide a method and apparatus for covering a roll core wherein the covering has a high impact strength.

It is a further object of this invention to provide a method for covering a roll core that is shorter in fabrication time than the prior art methods.

SUMMARY OF THE INVENTION

These and other objects of this invention are achieved by providing a method and apparatus for covering a roll core with a polymeric material, preferably a high performance thermoplastic material. The method includes first providing a cylindrical roll core having two ends, a length, and an outer surface. A spacer ring assembly is attached proximate one end of the roll core, the spacer ring assembly having a circumference greater than that of the roll core. After being preheated to a desired temperature, the roll core is then placed within an apparatus in a substantially vertical orientation and held therein by opposed universal chucks. A length of mold tape is helically wound over the length of the roll core in a spaced-apart relationship therewith to define an application zone between the mold tape and the roll core outer surface. An extrudate formed of a polymeric material, preferably a high performance thermoplastic material having a continuous profile, is extruded within the application zone and helically wound over the roll core outer surface so that the roll core is covered with the extrudate.

Localized heating is applied to the roll core surface just prior to the application of the extrudate to improve bonding to the roll core surface. The mold tape dispenser, induction heating device, and the extruders are all located on a turntable that rotates concentrically around the roll core while the roll core remains non-rotational and is lowered from an elevated position. The mold tape acts as a supportive form to prevent sagging of the extruded material prior to solidifying. The wound extruded material is allowed to solidify in a temperature controlled manner to be hardened to form a continuous layer over the length of the roll core. Finally, the mold tape is removed and the covered roll is machined to a predetermined roughness. The resulting covered roll fabricated in accordance with this method has minimal residual stresses and a has a higher tensile strength, compression strength and impact strength. The resulting covered roll also has a higher glass transition temperature, a more suitable Young's modulus, greater durability and a longer lifespan than prior art covered rolls. The covered roll fabricated in accordance with this method also performs consistently under extremely high pressures, high heating conditions and high speed conditions.

DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF A PREFERRED EMBODIMENT

Subsequent to the invention disclosed herein, improvements were made by the above captioned co-inventor, Yang T. Shieh, alone. These improvements constitute the best mode contemplated by him, at the time of filing of this application, of carrying out his invention. These improvements are disclosed in a co-pending application and are hereby incorporated herein by reference for the purpose of disclosing the best mode known only to the co-inventor, Yang T. Shieh. The best mode known to the other co-inventors, Jose J.A. Rodal and Erik Vaaler, is disclosed in this application. The co-inventors, Jose J.A. Rodal and Erik Vaaler have not reviewed nor studied the contents of the co-pending application being filed on even date herewith.

Figure 1:
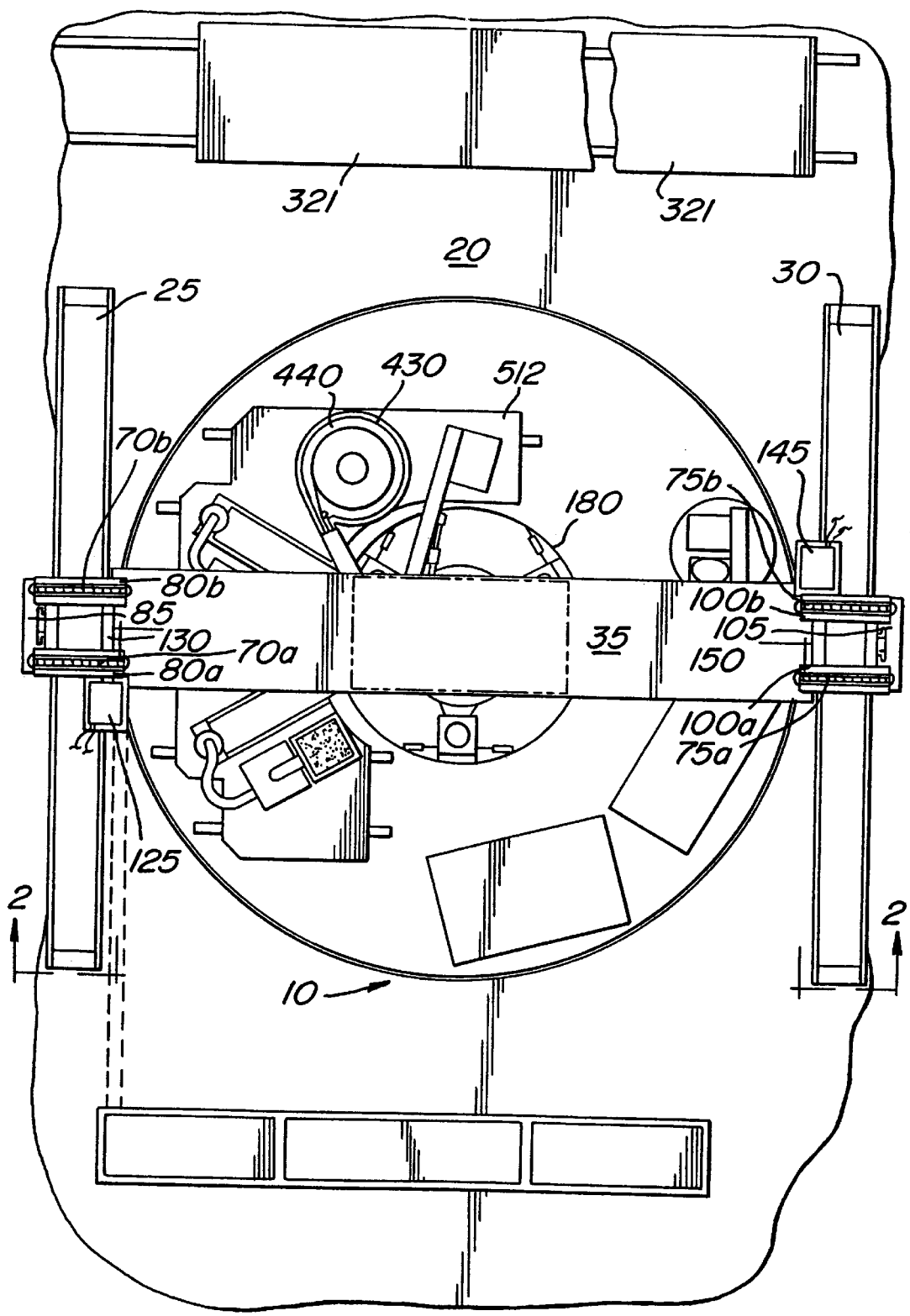
FIG. 1 is a top view of the preferred embodiment of the apparatus for covering a metal roll core with a high performance thermoplastic material or other polymeric material.
Figure 2:
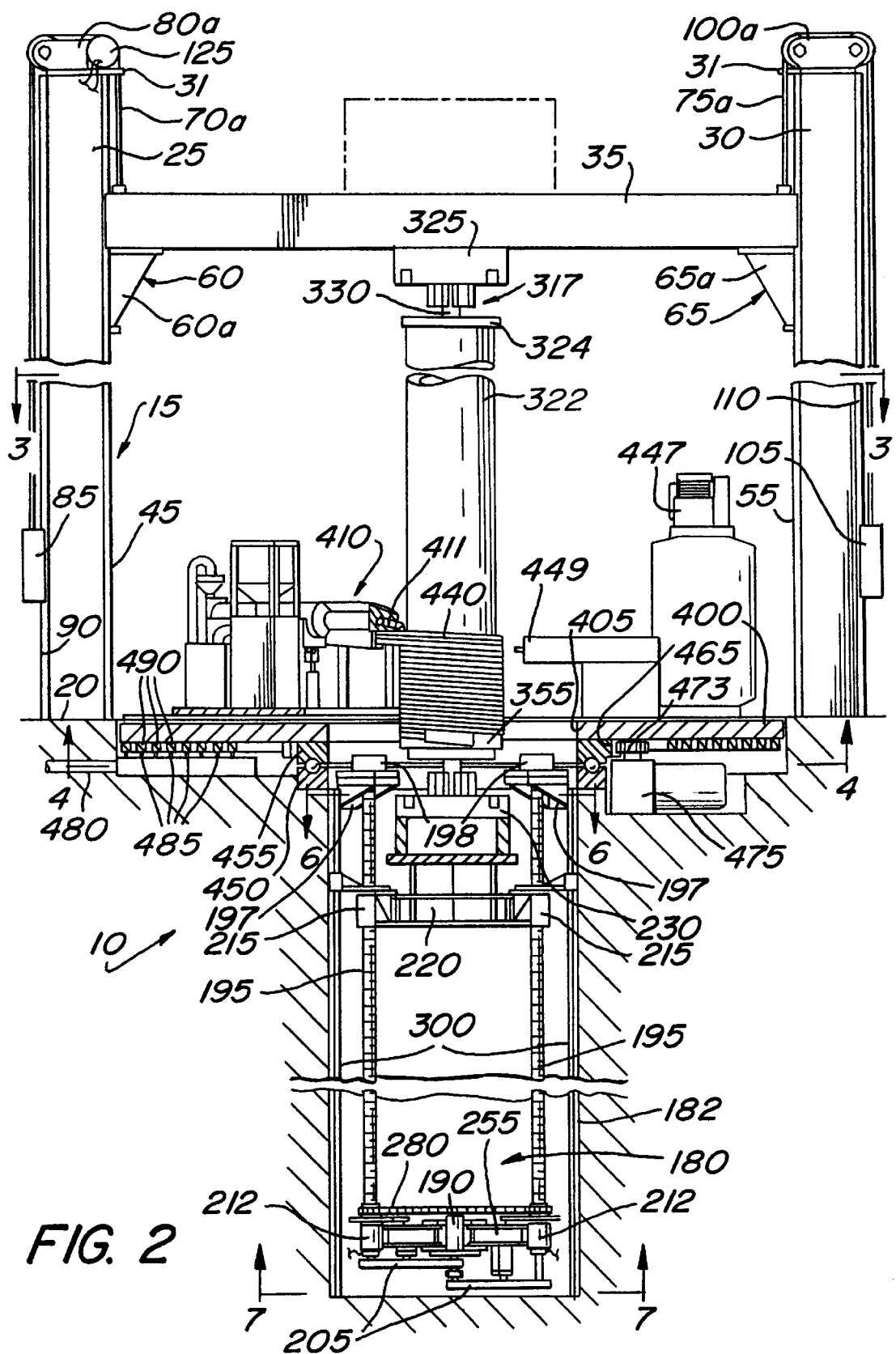
FIG. 2 is a sectional view taken along line 2—2 of FIG. 1.

Referring now in greater detail to the various figures of the drawings wherein like reference numerals refer to like parts there is shown at 10 in FIGS. 1 and 2, an apparatus for applying a polymeric covering to a metal roll core. Preferably, the polymeric covering is formed of a high performance thermoplastic material. However, the method and apparatus of the present invention also contemplates the use of other types of polymeric materials as roll covers such as other extrudable elastomers including rubbers or processable urethanes and high viscosity thermoset resins such as polyurethanes and epoxies in general. The apparatus is arranged for vertically orienting a metal roll core and applying a layer of polymeric material to the outside surface thereof to form a covered roll such as a large calender roll or supercalender roll that is used in industrial environments such as paper mills where the rolls are used for transporting and processing a web sheet of paper through a paper machine which becomes finished paper. More specifically, the present invention relates to a method and apparatus for covering the roll core with a polymeric material, preferably a high performance thermoplastic material which includes helically winding a filament 510 of the material around the roll core.

As shown in FIGS. 1 and 2, the apparatus includes a main frame assembly 15 that comprises a base portion 20 and a transverse frame assembly 35 that is horizontally disposed between a pair of side frame members 25 and 30 that are mounted to and rise vertically from the base portion 20. In the embodiment of the invention shown herein, the roll core is a conventional roll core that may be purchased from a roll core manufacturer to desired specifications, length, diameter, etc.

As best seen in FIG. 2, the main frame assembly 15 includes side frame members 25 and 30. Each side frame members 25 and 30 is of any suitable height, e.g., forty feet, and may be of any suitable construction, e.g., comprised of steel I-beams. Likewise, the transverse frame member 35 is formed of any suitable rigid material, e.g., a box-beam fabrication. As best illustrated in FIG. 2, the transverse frame member 35 extends between the side frame members 25 and 30 and is arranged for vertical movement therebetween. The side frame member 25 includes an inner face 40 having a precision linear track 45 disposed thereon running longitudinally along the center thereof. Likewise, the side frame member 30 includes an inner face 50 having an a precision linear track 55 running longitudinally along the center thereof. Attached to the bottom surface of the transverse frame member 35 are bracket assemblies 60 and 65 located at each end thereof Bracket assembly 60 includes a web portion 60a that includes a guide bearings (not shown) arranged to be disposed over the precision linear track 45 to enable sliding attachment of the transverse frame member 35 to the precision linear track 45. Likewise, the bracket assembly 65 includes a web portion 65a that includes a guide bearing (not shown) arranged to be disposed over the precision linear track 55 to enable sliding attachment of the transverse frame member 35 to the precision linear track 55. In this manner, the transverse frame member 35 may be moved vertically from an elevated position near the top of the side frame members 25 and 30 downwardly to a lowered position near the bottom of the side frame member 25 and 30. Additionally, each side frame member 25 and 30 is provided with a limit stop 31 at the top thereof to prevent further upward movement of the transverse frame member 35 beyond the elevated position.

Figure 3:
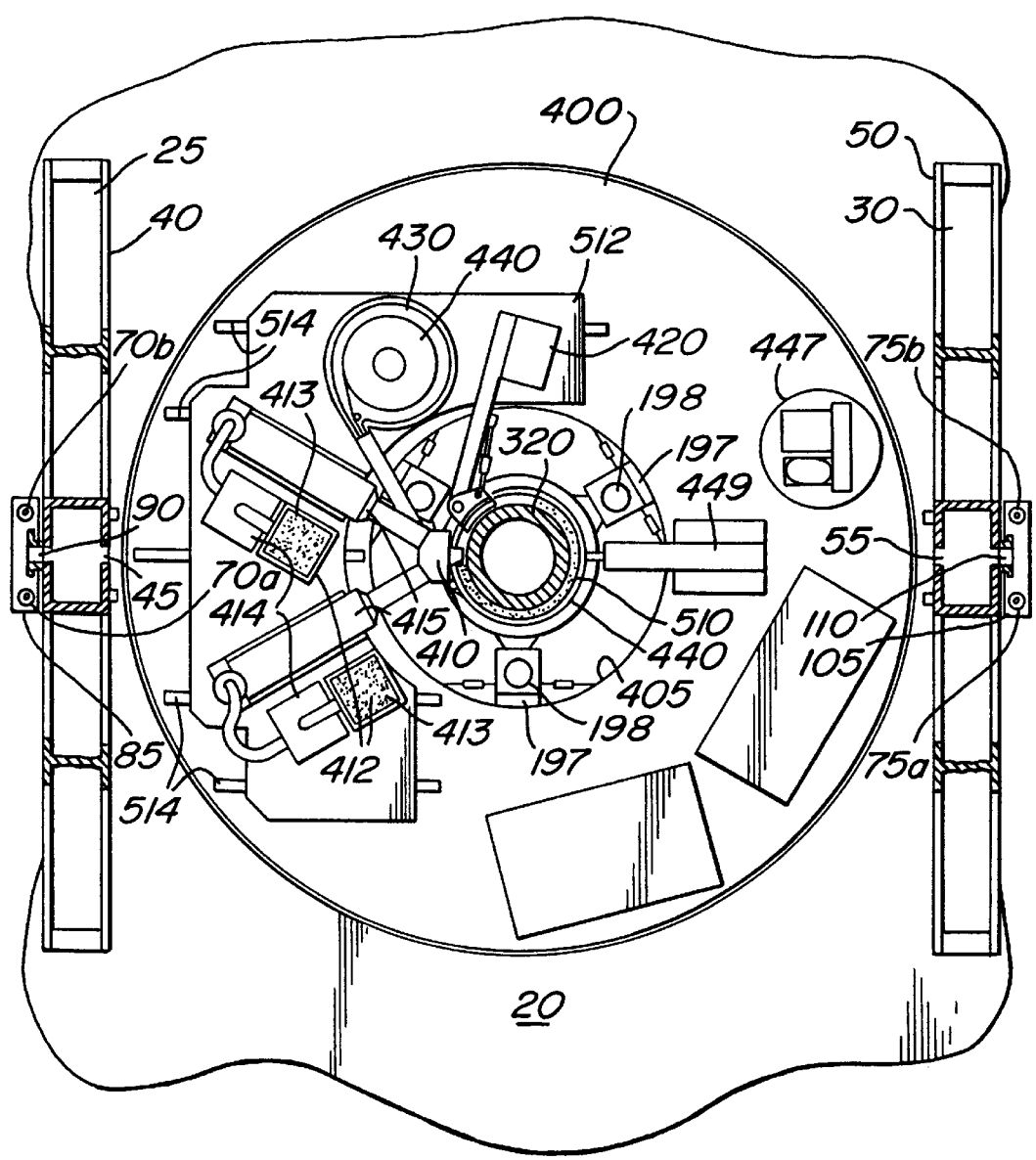
FIG. 3 is a sectional view taken along line 3—3 of FIG. 2.

The main frame assembly 15 also comprises a counterweight assembly for suspending the transverse frame member 35 between the side frame members 25 and 30 and countering the weight of the transverse frame member 35. Referring now to FIGS. 1–3, the counterweight assembly includes a pair of roller chains 70a and 70b attached at one end to the transverse frame member 35. The roller chains 70a and 70b extend over assemblies 80a and 80b, respectively, each comprising a pair of roller chain sprockets located at the top of the side frame member 25. The roller chains 70a and 70b are attached at their opposite ends to a counterweight 85. As best shown in FIG.3, the counterweight 85 travels along a longitudinal rail 90 disposed over the outer face of the side frame member 25. Likewise, a pair of roller chains 75a and 75b extend over assemblies 100a and 100b, each comprising a pair of roller chain sprockets located at the top of the side frame member 30. The roller chains 75a and 75b are attached at their opposite ends to a counterweight 105 that, like counterweight 85, travels on a longitudinal rail 110 (FIG. 3).

Prior to positioning a roll core vertically within the apparatus 10, in a manner to be described below, the transverse frame member 35 must be moved to or near its elevated position. Referring now to FIGS. 1, 2 and 3, in order to raise the transverse frame member 35 to the elevated position, an electric drive assembly 145 is drivingly connected to one of the roller chain sprockets at 100*b* at the top of the side frame member 30. The electric drive assembly basically comprises a motor in communication with a gear reducer (not shown) through a clutch brake (not shown) which is drivingly connected to one of the roller chain sprocket within the assembly 100*b*. The motor driven roller chain sprocket within the assembly 100*b* is connected to a roller chain sprocket within the assembly 100*a* through a drive axle 150 disposed therebetween. Thus, through its connection with roller chain sprockets located within both assemblies 100*a* and 100*b*, the electric drive assembly 145 drives the roller chains 75*a* (best shown in FIG. 2) and 75*b* (shown in FIG. 3 only) which connect to transverse frame member 35 at one end and to the counterweight 105 at the other end. Similarly, an electric drive assembly 125, constructed of the same elements as the drive assembly 145, is drivingly connected to one of the roller chain sprockets within assembly 80*a* at the top of the side frame member 25. The motor driven roller chain sprocket within the assembly 80*a* is connected to a roller chain sprocket within the assembly 80*b* through a drive axle 130 disposed therebetween. Thus, in a similar manner, the electric drive assembly 125 drives the roller chains 70*a* and 70*b* which connect to transverse frame member 35 at one end and to the counterweight 85 at its opposite end. The drive assemblies 125 and 145 are arranged to operate in synchronization to assure balanced raising and lowering of the transverse frame assembly 35.

Alternatively, one of the drive assemblies, i.e., drive assembly 125, could be eliminated by utilizing a lightweight torque tube having right-angle gear box at opposite ends (not shown). In particular, at one of its ends, the torque tube could be connected to a right-angle gear box, the output of which is connected to the roller chain sprocket within assembly 100*a*. The torque tube extends above the transverse frame member 35 from the side frame member 30 to the side frame member 25. At its opposite end, the torque tube drives the other right-angle gear box which is connected to a roller chain sprocket within assembly 80*a*. In this manner, the need for a second, simultaneously driven, drive assembly 125 is eliminated. Thus, through the torque tube with right-angle gear boxes at opposite ends (not shown) and drive axles 130 and 150, raising and lowering of the transverse frame member 35 may be accomplished in a balanced and synchronized manner utilizing the single drive assembly 145. Due to the fact that counterweights are provided, the electric drive assembly 145 needs to exert only a small amount of lifting force to raise the transverse frame member 35.

Figure 5:
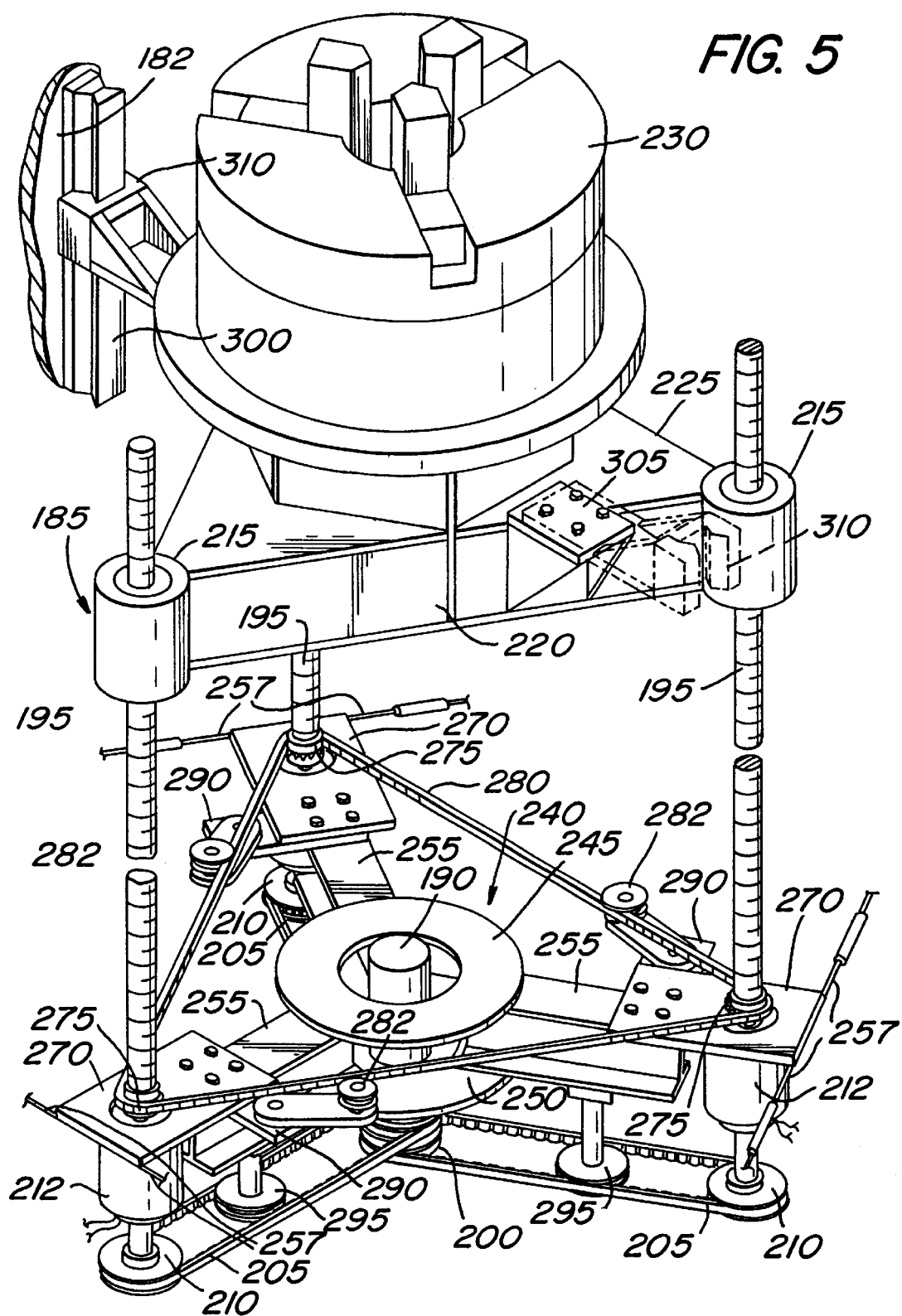
FIG. 5 is an isometric view of the motor driven elevator assembly which forms a portion of the apparatus of present invention.

Referring again to FIGS. 1 and 2, the base portion 20 additionally comprises a central opening 180 that is generally cylindrical in shape and includes a vertical wall 182 formed of any suitable material, e.g., a steel cylinder one-inch in thickness. The vertical wall 182 may be waterproof The central opening 180 may be of any dimensions sufficiently large to house a motor driven elevator assembly 185 (FIG. 5) located therein, e.g., forty-four feet deep and seven feet in diameter. Referring now to FIG. 5, the motor driven elevator assembly 185 comprises a motor 190 that is drivingly connected to a plurality of gear reducers 212, the output shafts of which are connected to a plurality of threaded ball screw shafts 195 that rotate in synchronization in response to operation of the motor. Each ball screw shaft 195 is affixed adjacent the vertical wall 182 and is suspended therefrom within the central opening by means of a bracket 197 (FIG.2). The opposite driven end of each ball screw shaft 195 suspends freely within the central opening 180. As best shown in FIG. 2, each ball screw shaft 195 is mounted within a conventional bearing housing 198 that permits rotational movement of the ball screw shaft 195. Referring again to FIG. 5, the motor 190 is provided with a drive pulley 200 that extends below the motor 190 and can accommodate a plurality of continuous loop drive timing belts 205 extending thereover. The drive timing belts 205 also extend over timing belt sprockets 210 to enable synchronous rotation of the ball screw shafts 195. A gear reducer mechanism 212 is provided between each timing belt sprocket 210 and each ball screw shaft 195 for the purpose of reducing the revolutions per minute from the timing belt sprocket 210 to the ball screw shaft 195. The gear reducer 212 may be of any suitable construction that couples the ball screw shaft 195 and the timing belt sprocket 210.

As best shown in FIG. 5, disposed over each ball screw shaft 195 is an internally threaded moveable ball nut element 215 that moves vertically and non-rotationally in response to rotational movement of the ball screw shaft 195. The moveable ball nut elements 215 are affixed at the corners of a generally triangular platform assembly 220 comprising a horizontal plate 225 on which an upwardly facing universal chuck 230 is fixedly secured. The upward facing chuck is arranged for receiving the bottom end of the roll core. Thus, upon motor driven synchronous rotation of the ball screw shafts 195 in one direction, the platform assembly 220 is caused to move upwardly. Likewise, motor driven synchronous rotation of the ball screw shafts 195 in the opposite direction causes the platform assembly 220 to move downwardly. Like the transverse frame member 35, the platform assembly 220 is arranged for movement within the central opening 180 from an elevated position wherein the moveable ball nut elements 215 are located near the top of the ball screw shafts 195 adjacent the brackets 197 to a lowered position wherein the moveable ball nut elements 215 are positioned just above chain sprockets 275.

The motor 190 is housed at the center of a frame assembly 240 that comprises a central portion formed of two circular plates 245 and 250 each having a central opening in which the motor is disposed. The frame assembly 240 also comprises arms 255 that extend radially at 120° intervals from the central portion. Each arm 255 is formed of a steel I-beam that includes a vertical web disposed between two horizontal webs. Each arm is secured at its proximal end to the central portion by any suitable means, e.g., welding. Specifically, circular plate 245 is secured to the top surface of the arms 255 while circular plate 250 is secured in a similar manner to the bottom surface of these arms. A bracket 270 is secured at the distal end of each arm 255 to the top surface thereof by any suitable means, e.g., bolting.

Figure 7:
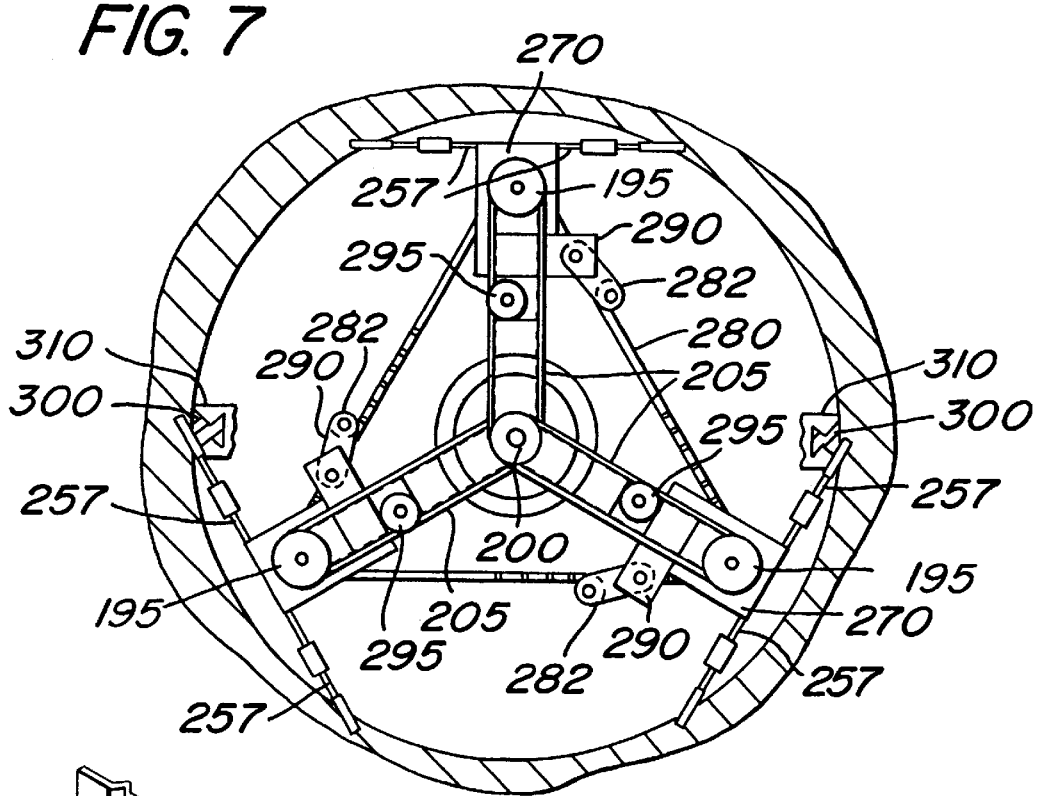
FIG. 7 is a sectional view taken along lines 7—7 of FIG. 2.

Referring now to FIGS. 5 and 7, the entire frame assembly 240 is secured to the vertical wall 182 by a plurality of anchoring rods 257, each rod being provided with a threaded portion and an internally threaded turnbuckle disposed thereover to enable tightening and loosening of each anchoring rod 257. Each anchoring rod 257 comprises a first end arranged for attachment to the bracket 270 located at the distal end of each arm 255 of the frame assembly 240 and a second end arranged for attachment to the vertical wall 182 of the opening 180. As best shown in FIG. 7, the anchoring rods 257 are arranged in pairs and are oriented tangentially with respect to the direction of rotational movement of the electric motor 190 for the purpose of reducing swinging and vibrations resulting during operation of the electric motor 190 while allowing for load-induced and thermally induced length changes of the ball screw shafts 195.

Each bracket 270 includes an internal bore through which one of the ball screw shafts 195 is disposed. Each ball screw shaft 195 is provided with an additional chain sprocket 275 located just above each bracket 270. A continuous safety chain 280 extends over the chain sprockets 275. The safety chain 280 is provided to assure continued rotation of the ball screw shafts 195 in a synchronized manner in the event of a drive timing belt 205 failure during operation of the apparatus 10. A plate 290, secured between each bracket 270 and the top surface of each arm 255, serves as a mounting surface for a tensioning roller assembly 282 that abuts the safety chain in order to provide tension thereto. Similarly, a plurality of roller assemblies 295 extending downwardly from the bottom surface of arms 255 provide tensioning to the drive timing belts 205.

Figure 6:
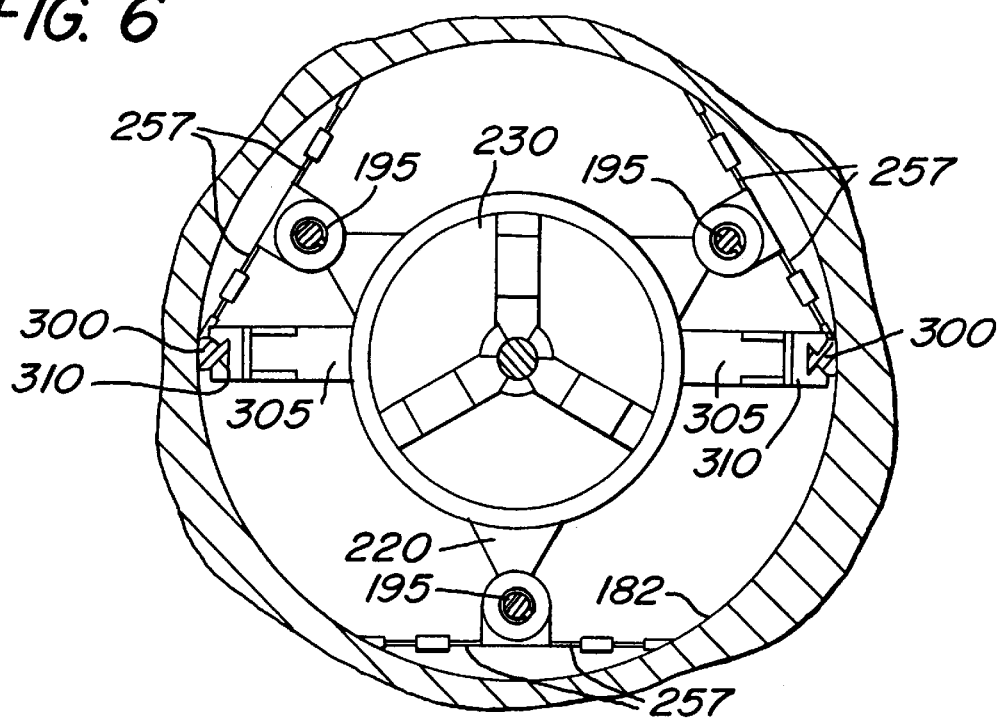
FIG. 6 is a sectional view taken along lines 6—6 of FIG. 2.

As best shown in FIGS. 5 and 6, a pair of linear guide rails 300 are disposed vertically in opposing relation on the vertical wall 182 of the opening 180. Bracket assemblies 305 secured to opposite ends of the triangular platform assembly 220 include linear bearings 310, each linear bearing assembly being arranged to be disposed over each of the linear guide rails 300 to enable vertical sliding movement of each linear bearing over the length of the guide rails 300. Attachment of the triangular platform assembly 220 to the guide rails 300 in this manner prevents rotational and lateral movement of the platform assembly 220 during raising and lowering.

Figure 9:
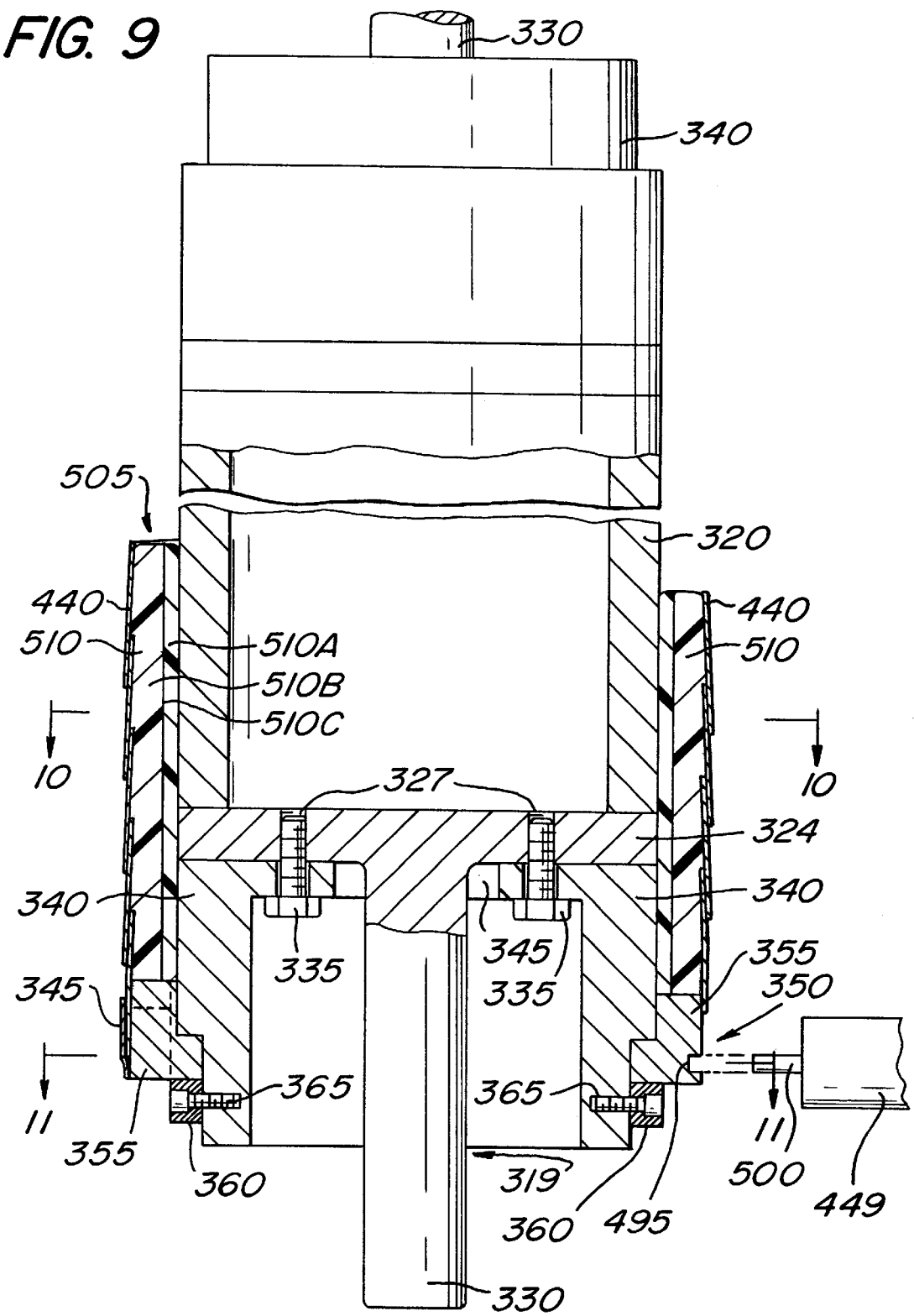
FIG. 9 is a fragmentary view, partially in section, of the metal roll core covered with the high performance thermoplastic material or other polymeric material in accordance with the present invention.

Referring now to FIGS. 2 and 9, a roll core 320 with exposed outer surface 322 is shown disposed between the upwardly facing universal chuck 230 and a downwardly facing universal chuck 325 disposed on the bottom surface of the transverse frame member 35. When placed within the apparatus 10 in this vertical orientation, the roll core comprises a top end 317 and a bottom end 319. The universal chucks are aligned to assure substantially vertical orientation of the roll core 320. The roll core 320 is of a predetermined length and is generally cylindrical in shape and includes a central axis and an outer surface 322 formed of any suitable material, e.g., metal. As best shown in FIG. 9, the metal roll core 320 additionally comprises end caps 324 that are secured to the ends thereof by any suitable means. The end caps 324 have a circumference approximately the same as that of the roll core and include journals 330 that are concentric with the central axis of the metal roll core 320 and enable securement of the metal roll core 320 within the opposed universal chucks 230 and 325.

Figure 12:
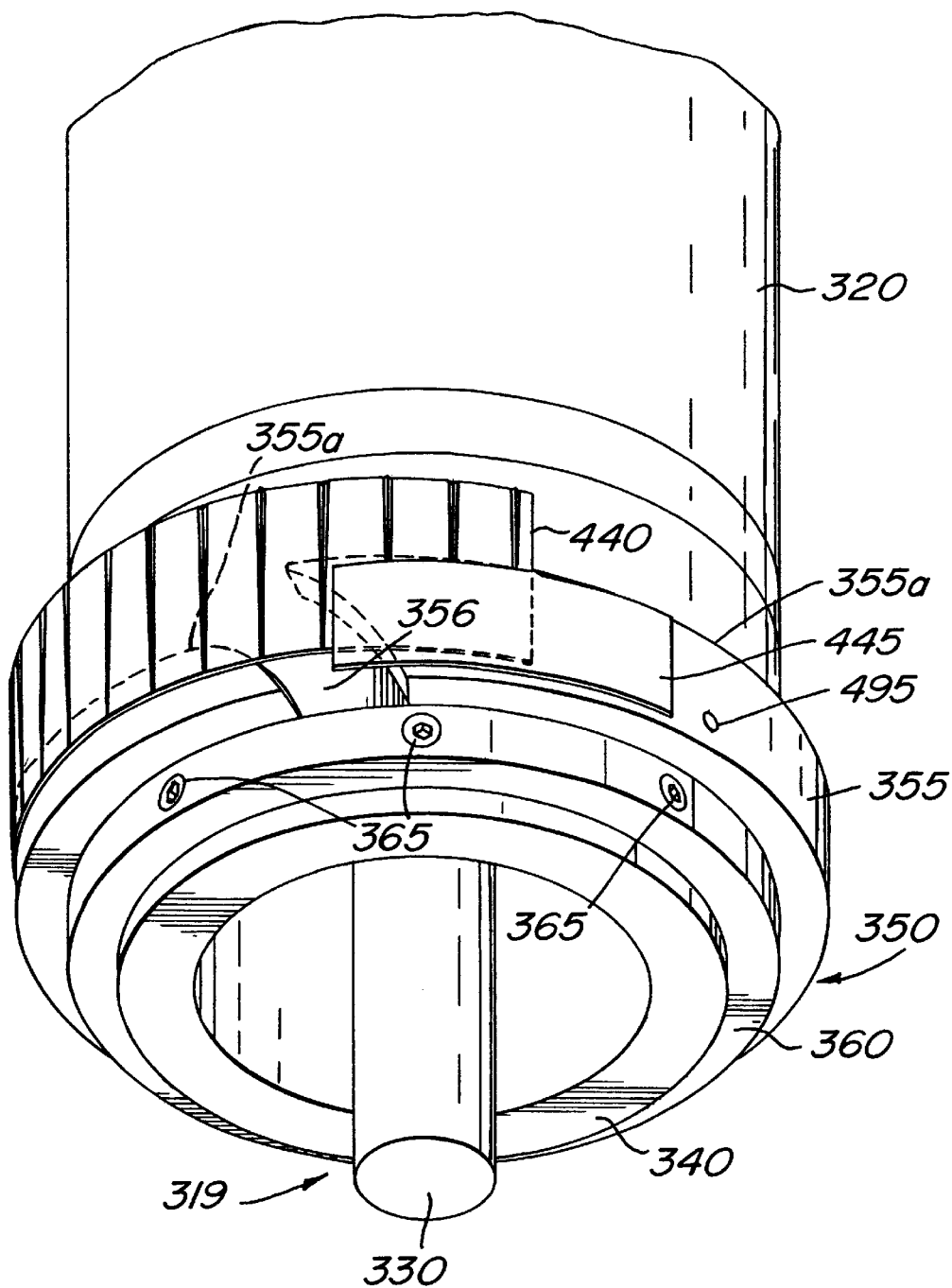
FIG. 12 is an isometric view of the bottom end of the roll core.

The end caps 324 are provided with threaded openings 327 to enable the attachment of extension segments 340 thereto by any suitable means, e.g., bolts 335. Each extension segment 340 is provided with a circumference approximately equal to that of the roll core and further comprises a central opening 345 for disposition of the extension segment 340 over the journal 330 to enable attachment of the extension segment 340 to the end cap 324. Further, a spacer assembly 350 is arranged for attachment to the bottom end 319 of the roll core 320 over the extension segment 340 located thereon. As best seen in FIGS. 9 and 12, the spacer assembly 350 comprises a spacer ring 355 and a locking ring 360. The spacer ring 355 has an outer circumference that is larger than that of the roll core 320 and is slidably mounted over the extension segment 340 by means of the locking ring 360. In particular, with the spacer ring 355 brought into abutting relationship with the extension segment 340, the locking ring 360 abuts the spacer ring 355 and is fixedly secured to the extension segment 340 by any suitable means, e.g., bolts 365. By attachment of the spacer ring 355 in this manner, it may slidably rotate concentrically about the outer surface of the roll core 322. The extension segments 340 and the spacer assembly 350 are each attached at the ends of the roll core 320 prior to placement of the roll core 320 within the apparatus 10.

Referring again to FIG. 12, the spacer ring 355 includes a slightly inclined top surface 355a which extends approximately one revolution around the roll core to form a ramp. The amount of incline over the entire length of the top surface 355a, e.g., approximately 0.50 inches, is based upon the rate of downward movement of the roll core 320, e.g., 0.50 inches per rotation of a turntable 400 discussed below. The spacer ring 355 is also provided with an opening 356 through which roll cover material may be extruded while start-up adjustments are made to the extruder in a manner to be discussed in detail below.

Referring now to FIGS. 2 and 3, the apparatus 10 includes a turntable 400 which includes a central opening 405 that is circular, concentric with, and substantially equal in diameter to the central opening 180 in the base portion 20. As a result, when located between the opposed universal chucks 325 and 230 and secured therein, the roll core 320 may be lowered from an elevated position, wherein the entire roll core 320 including its bottom end 319 thereof is disposed above the base portion 20 and turntable 400, to a lowered position wherein the roll core length 320 is disposed within the central opening 405 of the turntable and within the central opening 180 of the base portion.

Figure 4:
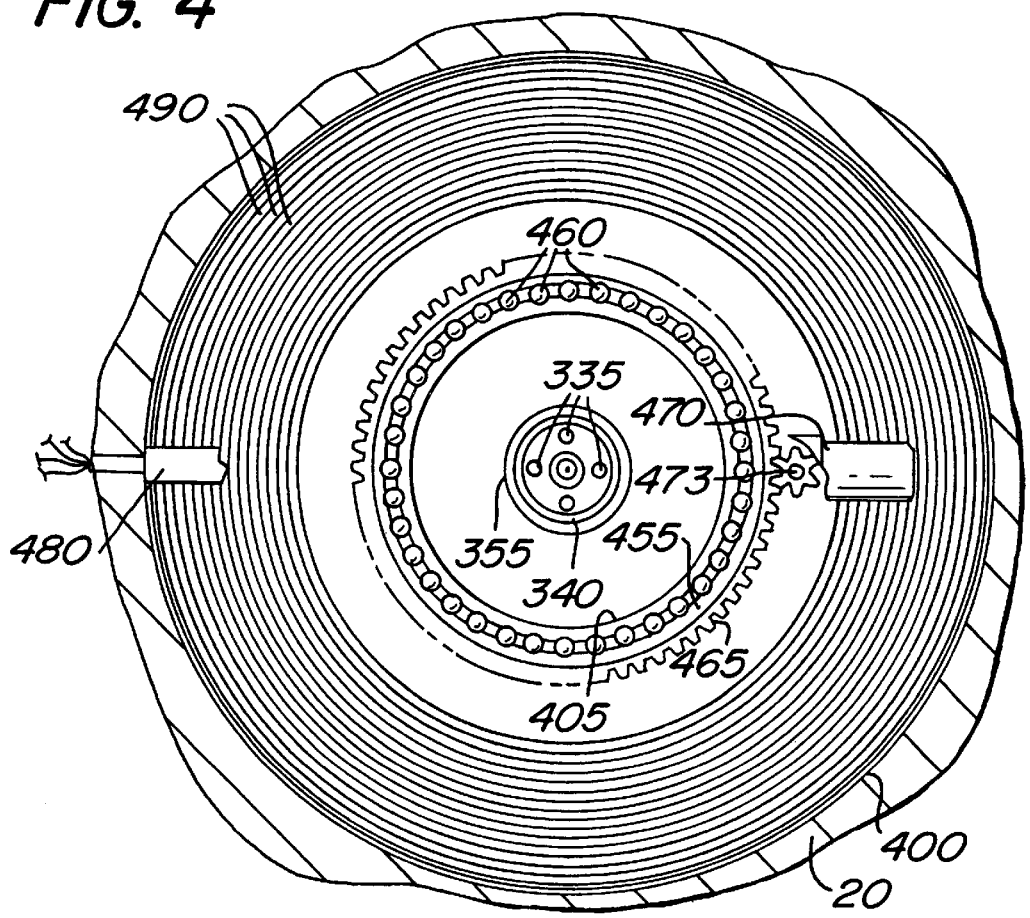
FIG. 4 is an enlarged sectional view taken along line 4—4 of FIG. 2.

Referring now to FIGS. 2 and 4, the turntable 400 is rotatably mounted to the base portion 20 by means of a race assembly that includes an upper race 455 (best shown in FIG. 4) that is attached to the underside of the turntable 400 and a lower fixed race 450 (best shown in FIG. 2) that is attached to a portion of the base portion 20. Together, the lower and upper races form a raceway in which turntable ball bearings 460 are disposed thus enabling rotatability of the turntable 400 over the base 20. The center of the turntable 400 is aligned with the central axis of the upper and lower chuck assemblies 325 and 230. Referring again to FIG. 2, a motor 470, having an associated gear reducer 475, is mounted to a surface of the base portion 20 below the turntable 400. The motor 470 is drivingly connected to the turntable 400 by means of connection of the gear reducer's gear wheel 473 with a ring gear 465 integral to upper race 455 (best shown in FIG. 4) located on the underside of the turntable 400. Thus, motor 470 and its associated gear reducer 475 control rotational movement of the turntable 400.

In FIGS. 2 and 3, several devices are shown mounted to a moveable platform 512 that is moveably secured within a plurality of elongated slots 514 located on the turntable 400. These devices include an extruder assembly 410, an induction heater assembly 420, a mold tape dispenser 430 for dispensing a length of mold tape 440 spooled thereon, a pin indexing device 449 and other devices to be discussed below. In this manner, the platform 512 may be moved along the elongated slots 514 to adjust the distance of the platform mounted devices from the roll core outer surface 322 thus enabling the thickness of the filament 510 to be adjusted prior to application to the roll core outer surface 322. In other words, the adjustable platform 512 allows radial positioning of the equipment in reference to the radial dimension of the roll core. Alternatively, these devices could be mounted directly to the turntable. Because the turntable 400 is rotatably mounted to the base portion 20, it enables movement of these devices 410, 420 and 430 in a circular path around the roll core 320 while the roll core remains non-rotational and is lowered from its elevated position downwardly so that a layer of polymeric material or filament may be added over the outer surface of the roll core. The extruder assembly 410 operates in away known by those practiced in the art and comprises a plurality of bins 412, e.g., two, in which pelletized polymeric material 413 may be placed. The pelletized polymeric material 413 falls by gravity from each bin 412 into a hopper 414 connected thereto. From each hopper 414, the pelletized polymeric material is transported into an extruder 415. Each extruder 415 extrudes the polymeric material into a common feeding head 411 (best shown in FIGS. 2 and 3) which applies a filament 510 of continuous profile of the polymeric material to the roll core outer surface 322.

Figure 10:
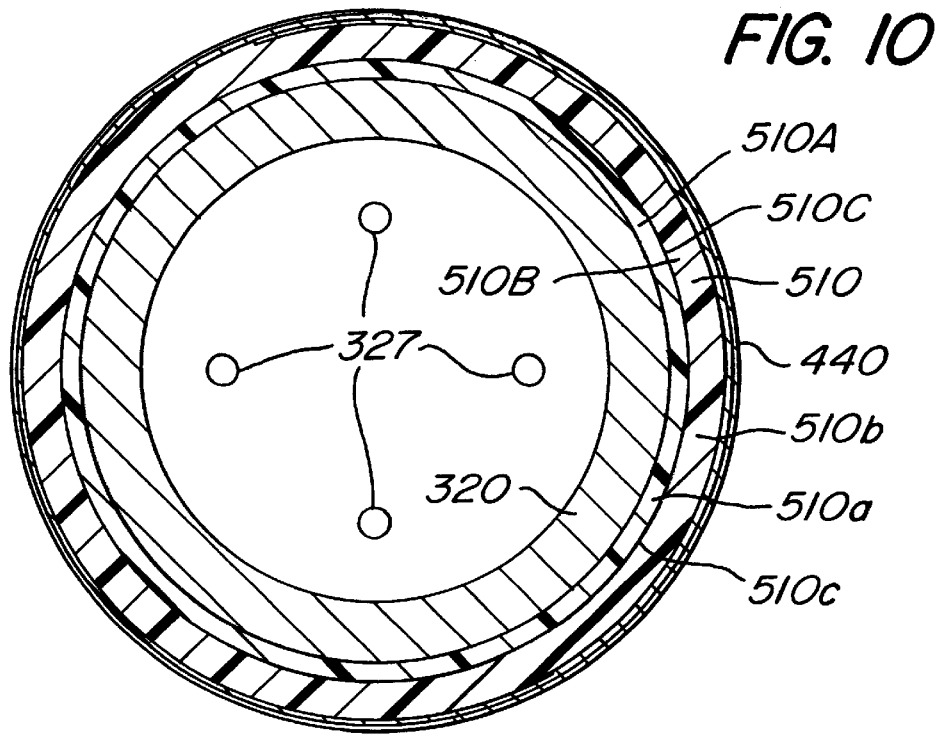
FIG. 10 is a sectional view taken along line 10—10 of FIG. 9.
Figure 11:
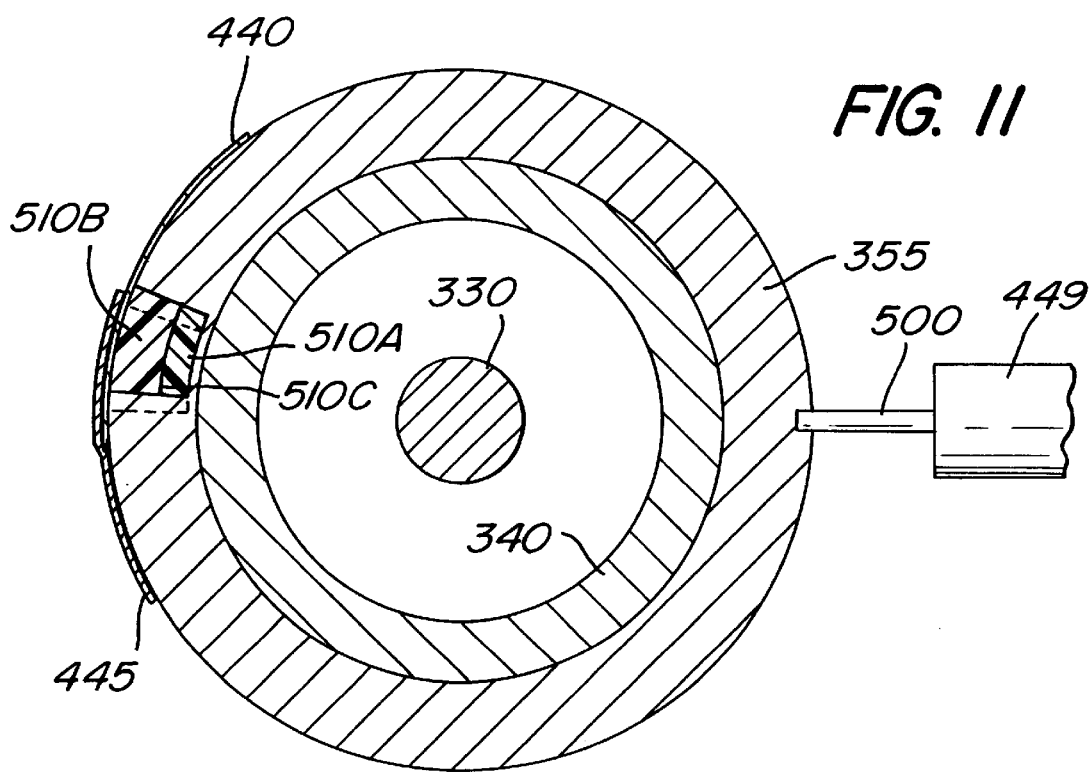
FIG. 11 is a sectional view taken along line 11—11 of FIG. 9.

Because the feeding head 411 is common to several extruders 415, several different polymeric materials each having a different amount of filler or additive may be combined in the feeder head 411 and applied to the roll core outer surface 322 to form a polymeric filament 510 comprised of several discrete layers, each layer having different mechanical properties, which are bound together at a common bonding interface. For example, one of the bins 412 may be loaded with pelletized thermoplastic material 413 having a low fiber concentration or no fiber content at all while the other is loaded with pelletized thermoplastic material 413 having a higher fiber concentration. Referring now to FIGS. 9, 10 and 11, in this manner, the two different thermoplastic materials converge in the feeding head 411 and the resulting extrudate is a dual layer filament 510 comprising a thermoplastic under layer 510*a* having a higher fiber content and a top stock 510*b* having a lower fiber content or no fiber content. The under layer 510*a* and top stock 510*b* are bound together at a bonding interface 510*c*. Employing a higher fiber content in the thermoplastic under layer 510*a* results in lowering the coefficient of thermal expansion of this layer to a level which is closer to that of the metal surface 322 of the roll core thus resulting in minimizing residual stresses upon hardening. Employing a higher fiber content in the under layer 510*a* improves bonding with the roll core metal surface and also increases thermal conductivity, thermal stability and impact resistance. The lower fiber concentration of the top stock 510*b* of the filament 510 results in a softer and smoother outer surface which provides desired operating characteristics. Alternatively, both the under layer 510*a* and the top stock 510*b* may be formed of thermoplastic material having the same composition including fiber content. Further, additives other than fibers may be added to the thermoplastic material to change the mechanical properties of the layers.

Under the invention, there are many different suitable polymeric materials including high performance thermoplastic materials and thermosetting materials that may be employed in the filament 510 for covering the roll core outer surface 322. Example thermoplastic materials that are particularly suitable are polyetherimide or polyethersulfone, polyphenylene sulfide, polyphenylene oxide, or polyetheretherketone. There are a number of advantages to utilizing a high performance or engineering thermoplastic material as the filament 510 as opposed to thermosetting materials, such as a fibrous carrier soaked in an epoxy resin, which is utilized under the prior art. Most importantly, a filament 510 comprised of a high performance thermoplastic material results in significantly higher performance characteristics, e.g., higher tensile strength, a more suitable Young's modulus (modulus of elasticity), higher temperature resistance, lower surface roughness, greater durability, and longer lifespan. Other viscous thermoset materials such as polyurethane and epoxy may be applied to a metal roll core in accordance with the method and utilizing the apparatus of the present invention.

Referring again to FIGS. 2 and 4, at this juncture it is important to mention that each of the devices mounted to the rotatable turntable 400 requires electrical power to operate. As best shown FIG. 2, electrical power for the turntable-mounted devices is provided from an outside source through cables 480 which are in communication with a plurality of conductive brushes 485 which are in electrical contact with a plurality of concentrically mounted slip rings 490 disposed on the underside of the turntable 400 (also shown in FIG. 4). In this manner, electricity is conducted from the slip rings up through the turntable 400 to provide electrical power to the devices mounted thereon. In the same manner, a non-rotational automatic control computer is also in communication with the turntable mounted devices through additional slip rings.

The process for applying polymeric materials including a high performance thermoplastic material to the outer surface of the roll core 320 will now be discussed in detail as a typical case for utilizing the method and apparatus of the invention. At the start of the process, a spent roll core 320 is returned from a customer such as a paper mill, textile mill or magnetic film manufacturer where such covered rolls are utilized in manufacturing finished products. The roll core is returned from the customer with the cover substantially consumed and, therefore, a new cover must be applied. First, after residual cover material is removed, the roll core outer surface 322 must be thoroughly cleaned in ways known to those practiced in this art. The cleaning process includes degreasing or removing all greases and/or oils remaining on the roll core outer surface 322 by utilizing known chemical solvents and solutions. After the degreasing step, the extension segments 340 are fixedly secured to the ends of the roll core 320 in the manner described above. Next, the entire roll core outer surface 322 with the extension segments 340 fixedly secured thereto is shot blasted for the purpose of removing all rust, dirt and remaining debris of roll cover materials. After shot blasting, several coats of chemical solutions, varying in concentration, are added to the roll core outer surface 322 at predetermined time intervals in ways known to those practiced in the art. The coatings are added to the roll core outer surface 322 to enhance adhesion with the polymeric layer 510 to be added later. The coating solution is formed of a material similar in composition to that of the polymeric filament 510 to be applied thereover although of a lower concentration, e.g., from 2% to 7.5% weight. The coatings are applied to form a thin film, less than ten thousandths of an inch in thickness, which fills in all voids on the roll core outer surface upon drying. The coatings also prevent corrosion of the metal core outer surface. Next, the spacer ring 355 is slidably mounted over the extension segment located at the roll core bottom end 319 utilizing the locking ring 360 in the manner previously described.

Referring now to FIG. 1, the entire roll core 320 is placed in an oven 321 and preheated until the outer surface 322 thereof and the extension segments reach a predetermined temperature, e.g., 95° to 550° F. Once the outer surface has reached the predetermined temperature, the roll core is removed from the oven 321 and located in the apparatus 10 and held vertically between the opposed chucks 230 and 325 in the elevated position in the manner previously described.

Next a "start-up process" is performed for two purposes: (1) to apply a predetermined amount of tension to the mold tape 440; and, (2) to stabilize the polymeric material being extruded from the feeding head 411 of the extruder assembly 410 to assure a proper rate of extrusion during rotation of the turntable 400. The start-up is performed prior to application of the polymeric material over the roll core outer surface. Generally speaking, during start-up, the turntable 400 and the extruder assembly 410 mounted thereto are rotated around the non-rotating roll core while the elevator is prevented from descending. Filament, extruded from the extruder head 411, drops through the opening 356 in the spacer ring 355 which is rotating with the turntable 400 and extruder assembly 410.

The start-up process is now described in more specific detail. The mold tape dispenser 430 is provided for dispensing a length of mold tape 440 that is stored in spooled form thereon at a predetermined temperature and under tension control. Referring now to FIG. 12, to perform the "start-up," a leading edge of the mold tape 440 is unspooled from the mold tape dispenser 430 and is attached to the outer surface of the spacer ring 355 by any suitable means, e.g., high temperature adhesive tape 445. As best shown in FIGS. 11 and 12, the leading edge of the mold tape 440 is applied in a manner so that it extends over the opening 356 which forms as an integral part of the spacer ring 355. Rotation of the turntable 400 is started with the roll core 320 remaining non-rotational and in the elevated position. In other words, during the start-up, the elevator assembly 185 is not activated and therefore, the roll core remains in the elevated position rather than being lowered therefrom. During the start-up procedure, it is important that the mold tape 440 does not begin the helical winding process. To prevent this from happening, the spacer ring 355, to which the leading edge of the mold tape 440 is attached, must rotate with the turntable while the roll core remains non-rotational. To enable slidable rotation of the spacer ring 355 during the start-up, the spacer ring is provided with a bore 495 in its sidewall that is aligned with and arranged to receive a pin 500 mounted on the turntable mounted pin indexing device 449. During the start-up process, the pin indexing device 449 is arranged for indexing the pin 500 from a retracted position (best shown in FIG. 9) wherein the pin 500 is withdrawn from the bore 495, to an extended position (best shown in FIG. 11) wherein the pin is inserted into the bore 495. The pin indexing device 449 is driven by compressed air delivered by an air compressor 447 (best shown in FIG. 2), also mounted on the turntable 400. When the pin 500 is inserted within the bore 495 of the spacer ring 355, the spacer ring 355 slidably rotates with respect to the roll core outer surface 322 as the turntable 400 rotates while the roll core 320 remains stationary. In this manner, during the start-up procedure, the mold tape 440, with its leading edge attached to the spacer ring 355 is prevented from winding onto the spacer ring 355.

The opening 356 is best shown in FIGS. 11 and 12. With the mold tape 440 extending over the opening 356 as shown therein, an enclosure is created having an open top and an open bottom. In this regard, the feeding head 411 of the extruder assembly 410 is positioned directly over the open top of the opening 356. Because the pin 500 is inserted in the spacer ring bore 495 during the startup procedure, the spacer ring opening 356 stays positioned directly under the extruder feeding head 411. In this manner, during start-up, while the feeder head 411 is adjusted to attain the proper feed rate during rotation, the thermoplastic material is extruded and drops through the opening 356 of the spacer ring 355 rather than piling up against the roll core outer surface. Once the predetermined mold tape tension has been reached and both the turntable 400 and the extrudate from feeder head 411 have reached stable rates, the start-up procedure is complete, and a polymeric layer may be built. In accordance with the present invention, the start-up procedure may be accomplished in only two to four rotations of the turntable 400.

Next, to build the thermoplastic layer, the pin 500 is withdrawn from the spacer assembly bore 495 and the spacer ring 355 is locked down to the extension segment 340 by any suitable means, e.g., taping. Thus, the spacer ring 355 remains non-rotational as does the roll core 320 on which it is mounted during turntable rotation. Simultaneously, the induction heater 420 is powered and the motor driven elevator assembly 185 is activated which causes the roll core 320 to be slowly lowered from the elevated position downwardly. Downward movement of the roll core 320 may be at any suitable rate, e.g., 0.50 inches per rotation of the turntable, and is determined by the dimension of the extrusion profile. Rotational movement of the turntable 400 causes the mold tape dispenser 430 to travel in a circular path around the roll core 320 and wind the mold tape 440 around the spacer ring 355 on the roll core 320. As best seen in FIGS. 2 and 9, lowering of the roll core 320 by the elevator assembly 185 causes the mold tape 440 to be wound helically in an overlapping manner over the length of the roll core 320 from the bottom 319 to the top 317 thereof The amount of overlap, e.g., approximately 1.50 inches, is determined by the rate of downward movement of the roll core 320, e.g., 0.50 inches per rotation of the turntable, and the height of the tape used, e.g., approximately two inches.

Figure 8:
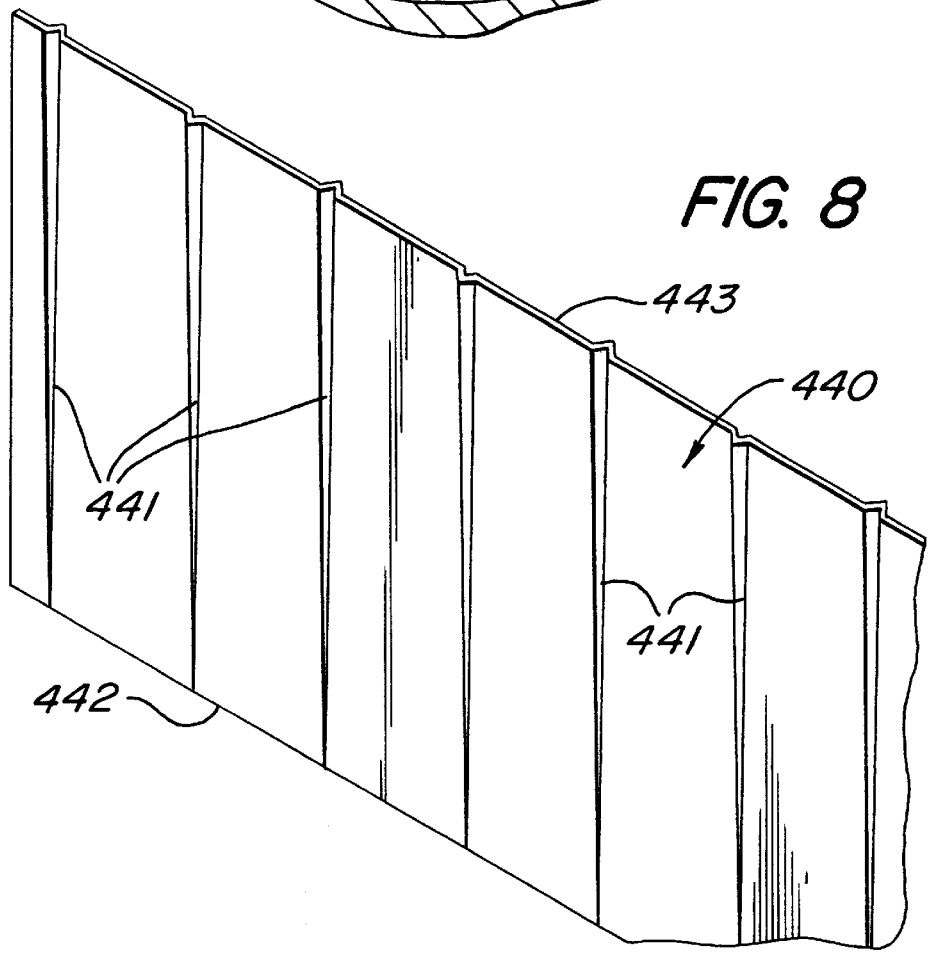
FIG. 8 is an isometric view of the mold tape which forms a portion of the apparatus of the present invention.

As best shown in FIG. 8, the mold tape 440 may be formed of any suitable material, e.g., stainless steel, and may be of any suitable height, e.g., approximately two inches and any suitable thickness, e.g., 0.005 inches. The mold tape 440 is provided with a plurality of crimps 441 along the length thereof The crimps 441 are spaced apart from one another by a predetermined distance, e.g., 9/16 inches, and alternate in resembling the letter "V" and an inverted letter "V". Each V-shaped crimp 441 gets progressively deeper in the mold tape 440 as the crimp 441 extends from the bottom edge 442 to the top edge 443 thereof, e.g., approximately 0.02 inches deep at edge 443. Inclusion of the crimps 441 causes the mold tape to transform from having straight edges 442 and 443 to having slightly curved edges with different lengths. By varying the distance the crimps 441 are spaced apart and by varying their depth, one can change the radius of curvature of the mold tape from being straight, and thus having no radius of curvature, to having a predetermined radius of curvature. As best shown in FIGS. 2 and 9, by achieving a particular radius of curvature, the crimped mold tape 440 may be helically wound over the roll cover in a manner that will result in a cylindrical shape rather than being that of an inverted cone if the mold tape had no radius of curvature.

Since the circumference of the spacer ring 355 is greater than that of the roll core outer surface 322, the mold tape 440 actually winds over the length of the roll core 320 in a spaced-apart relationship with the outer surface 322 thereof. In other words, the in-coming wound mold tape 440 does not contact the outer surface 322 of the roll core 320 but rather forms a weir or application zone 505 in which a continuous filament 510 of polymeric material, e.g., high performance thermoplastic material, may be extruded (best shown in FIG. 9). The application zone 505 is defined by the space between the inside surface of the helically wound mold tape 440 and the roll core outer surface 322.

While the mold tape 440 forms the application zone 505, the extruder assembly 410 extrudes the filament 510 of polymeric material therein. The mold tape 440 acts as a supportive form to prevent sagging of the filament 510 prior to hardening. Rotational movement of the turntable 400 causes the extruder assembly 410 to travel in a circular path around the roll core 320. That, combined with the slow lowering of the roll core 320 from the elevated position to the lowered position within the central opening 180 causes the continuous extruded filament 510 to be helically wound first onto the outer surface of the extension segment 340 located at the roll core bottom 319. The first winding of the filament 510 is supported by the spacer ring 355. Subsequent windings of the filament 510, are supported by the previous layer wound during the previous rotation. Subsequent windings of the filament 510 are wound onto the roll core outer surface 322 over its entire length from bottom to top and, thereafter, onto the extension segment 340 located at the roll core top 317.

Additionally, the turntable mounted induction heater 420 provides localized heating to the roll core outer surface 322 at a predetermined temperature according to the polymeric material used, e.g., approximately 750° F., just prior to application of the extruded thermoplastic filament 510 thereon. The localized heating is applied approximately ¼ inches from the roll core outer surface 322. In this manner the roll core outer surface 322, which consists of surface-treated exposed metal, is heated to approximately the same temperature as that of the extruded filament 510 preventing excessively rapid cooling of the filament 510 during application to the roll core outer surface 322.

The induction heating system 420 of the present invention is designed to be adjustable to heat the roll core metal outer surface rapidly to a high temperature prior to the application of molten polymer extrudate 510 thereto. The localized heating is only to a shallow skin depth on the roll core outer surface, e.g. a total depth of approximately 0.15 inch below the metal shell outer surface. Localized heating of the metal shell improves adhesion between the molten polymer and metal surface. The remaining mass of the roll core, which is at a lower temperature than the locally heated outer surface, slowly absorbs heat from the surface. The preheating of the roll core and the localized heating of its metal shell together allow the molten polymer applied thereto to cool down in a gradual manner. Stress buildup in the extruded filament 510 due to thermal shrinkage is minimized because cooling is gradual and extends through the bonding interface 510c towards the outside of the top stock 510b. The heat from the lower temperature preheated metal core acts as a brake and prevents the cooling process from occurring too quickly as the polymeric cover approaches its glass transition temperature ($T_g$) By prolonging the period at which the temperature of the filament 510 is maintained near but not below the glass transition temperature ($T_g$), an effective annealing process results that reduces residual stresses in the filament 510 dramatically. Also, because the under layer 510a comprises a higher fiber content than the top stock 510b, residual stresses are further reduced during cooling due to a smaller difference in the coefficient in thermal expansion (CTE) between the metal shell and the under layer 510a, and between the under layer 510a and the top stock 510b. Thus, application of localized heating in this manner effectively reduces residual stresses to the extruded filament 510 thus minimizing the possibility of cracking of the plastic cover. Localized heating also improves adhesion quality of the filament 510 to the roll core outer surface 322.

The filament 510 may be extruded onto the roll core outer surface 322 at a predetermined thickness that is suitable to the customer, e.g., between 0.300 inches to 1.000 inches utilizing different sizes of the feeding head 411. As mentioned earlier, in order to apply filament 510 to different sizes of roll core, the extruder assembly 410, induction heater 420 and mold tape dispenser 430 are all mounted on a moveable platform 512 that is moveably secured within a plurality of elongated slots 514 located on the turntable 400. In this manner, the platform 512 may be moved along the elongated slots 514 to adjust the distance of the platform mounted devices from the roll core outer surface 322 thus enabling the positioning of the filament 510 prior to application to the roll core outer surface 322.

As mentioned previously, during helical winding of the filament 510, the roll core 320 remains non-rotational while the extruder assembly 410 is rotated therearound along with the remaining turntable mounted devices. Application of the filament 510 is done in this manner rather than by rotating the roll core 320 and keeping the extruder assembly 410 and other turntable mounted devices stationary which would result in the build-up of centrifugal forces that would tend to propel the extruded filament 510 away from the roll core outer surface 322 during helical winding thereby impairing the bonding of the extruded filament 510 to the roll core outer surface 322.

This centrifugal force becomes detrimental when covering very large sized roll cores with relatively low viscosity or slow set-up resin materials at high production rates, i.e. high rotational speed. In the present invention, application of the continuous filament 510 onto the roll core 320 in a vertical orientation also utilizes gravitational force to pack down the filament 510 onto the supporting layer. Under the prior art methods, a cover is wound by rotating a roll core while oriented horizontally where the gravitational forces tend to push the cover against the roll core when it is at the top of its rotation and to pull the cover away from the roll core when it is at the bottom of its rotation. A higher rotation rate could be applied to even out this problem but it would result in the build-up of centrifugal force that tends to propel the deposited filament 510 away from the roll core outer surface 322. Also, under the prior art where the roll core oriented horizontally during winding of the cover, only a fast-set thermoset resin (either by its own exotherm or by externally applied heat) is suitable for use and the resulting cover may not be suitable for demanding applications such as super calendering.

Figure 13:
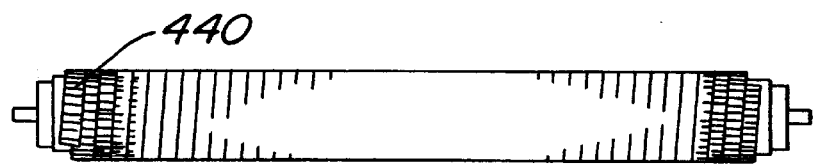
FIG. 13 is a side view of a metal roll core covered with a high performance thermoplastic or other polymeric material in accordance with the method of the present invention.
Figure 14:
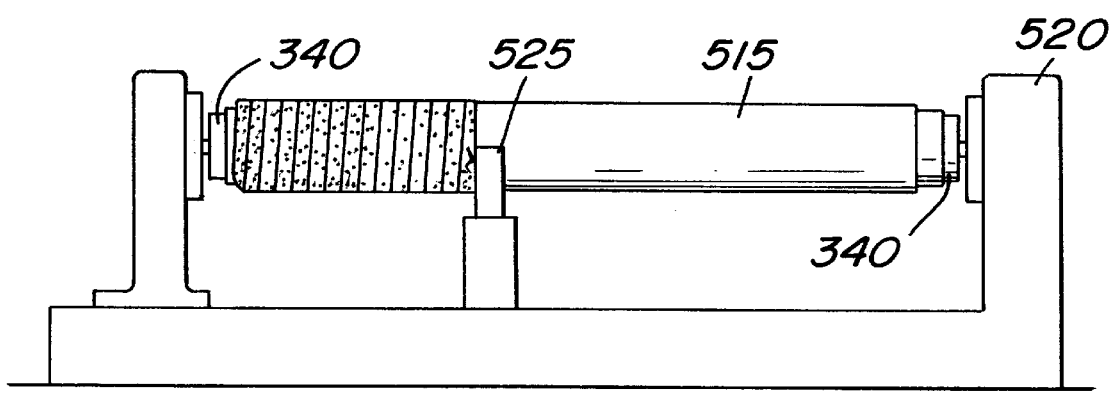
FIG. 14 is a side view of a metal roll core covered with a high performance thermoplastic or other polymeric material in accordance with the present invention shown held at its ends within a lathe; and, FIG. 15 is an isometric view of a finished roll core that has been covered with a high performance thermoplastic or other polymeric material in accordance with the present invention.

Next, the covered roll core is allowed to cool while housed within the central opening 180. Alternatively, the covered roll core may be removed from the apparatus 10 and placed in the oven 321 or a thermally insulated chamber to control the rate of cooling. Once the covered roll core has been removed from the apparatus 10 and hardening is complete, the mold tape 440 may be removed from the outer surface of the layer of thermoplastic material 510. As best shown in FIG. 13, the layer of thermoplastic material 510 has a roughened surface that must be machined to a desired smoothness. This may be accomplished by placing the covered roll core horizontally on a lathe 520 and machining the outer surface of the thermoplastic layer 510 to a predetermined smoothness 515 utilizing a suitable cutting tool 525.

Figure 15:
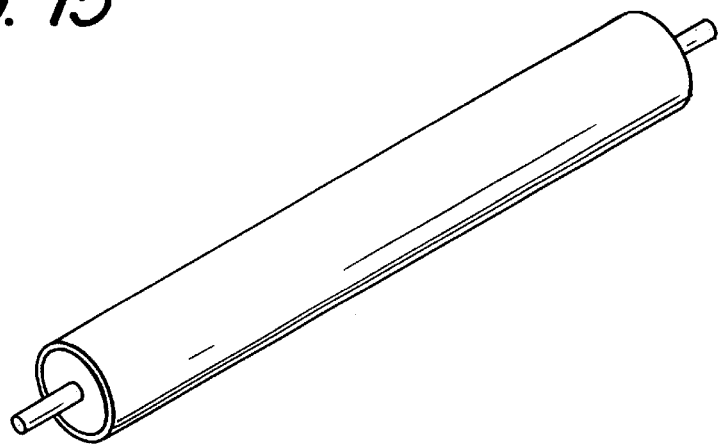

The next part of the process is to cut through the layer of thermoplastic material 510 down to the roll core outer surface 322 and remove the two extension segments 340 at the ends thereof The edges may be treated to form a slight bevel, which is currently known in the art, to obtain a finished roll that may be returned to the customer. The finished covered roll is shown at 550 in FIG. 15 with the extension segments 340 and spacer ring 350 removed. A typical covered roll with a dimension of 20 inches in diameter and 150 inches in length fabricated under the method and apparatus of the present invention possesses a combination of improved performance characteristics including: a surface roughness of between 0~2 Ra micro inch attainable, a Young's modulus between 650,000 and 1,000,000 psi, a cover hardness between 87 to 93 Shore D, and a glass transition temperature, $T_g$. of approximately 430° Fahrenheit; and a covering process finished in about one hour.

We claim:

1. An apparatus for applying a polymeric cover to a roll core, the roll core being generally cylindrical in shape and having a predetermined length, an outer surface having a circumference and a central axis, said apparatus comprising:

a. a main frame assembly comprising a base portion, a plurality of side frame members rising from said base portion and a transverse frame member rigidly extending between said side frame members, said transverse frame member further comprising a downwardly facing chuck located thereon;

b. a motor driven elevator assembly comprising a platform assembly arranged for vertical movement, said apparatus further comprising an upwardly facing chuck mounted on said platform assembly;

c. said chucks being aligned and spaced apart a predetermined distance to receive and secure the roll core therebetween in a substantially vertical orientation, the roll core having a bottom end and a top end when vertically oriented, said motor driven elevator assembly being provided for non-rotatably moving the roll core downwardly from an elevated start position to a lowered finish position;

d. a spacer assembly located proximate the bottom end of the roll core, said spacer assembly having an outer circumference greater than the roll core outer surface;

e. a turntable rotatably mounted on said base portion, said turntable including a central opening being large enough in size to accommodate vertical movement of the roll core therethrough from said start position to said finished position during application of the polymeric cover thereon;

f. a mold tape dispenser located on said turntable, said dispenser provided for dispensing a length of mold tape, said mold tape length having a leading edge arranged for securement to said spacer assembly;

g. at least one extruder positioned on said turntable; and, h. said turntable being arranged for rotation around the roll core while the roll core is lowered by said elevator assembly from said start position to said finish position, said turntable rotation causing said mold tape dispenser and said extruder to travel in a circular path around the roll core thus causing said mold tape to helically wind around the roll core outer surface in spaced-apart relationship therewith to define an application zone between the inside surface of said mold tape and the roll core outer surface, said extruder provided for applying said extruded filament within said application zone and winding said filament over the roll core outer surface such that when said roll core reaches said finished position, it is covered with a layer of said polymeric material, said mold tape acting as a supportive form to prevent sagging of said layer prior to hardening.

2. The apparatus of claim 1 additionally comprising biasing means for normally biasing said transverse frame member to a position wherein said chucks may secure the roll core in said elevated position.

3. The apparatus of claim 2 wherein said biasing means comprises sprocket means mounted at the top of each said side frame member, said biasing means further comprising a chain associated with each said sprocket means, each said chain cable having a first end and a second end, said first end being connected to said transverse frame member, each said chain extending over each said sprocket means and being connected at its second end to a counterweight, said counterweight being provided to offset the weight of said transverse frame member.

4. The apparatus of claim 1 wherein the roll core is provided with extension segments at each end thereof, each extension segment having a circumference approximately equal to that of the roll core, and wherein said spacer assembly is secured over said extension segment located at the bottom end of the roll core, said spacer assembly being slidably mounted to said extension segment to permit said spacer assembly to rotate with respect to the central axis of the roll core.

5. The apparatus of claim 4 wherein the difference between the outer circumference of said spacer assembly and the outer circumference of the roll core defines the thickness of said layer of polymeric material.

6. The apparatus of claim 4 wherein each said extension segment attaches to an end of the roll core by bolting.

7. The apparatus of claim 6 wherein said spacer assembly comprises a spacer ring and a locking ring, said spacer ring being slidably mounted over said extension segment thus permitting said spacer ring to rotate with respect to the central axis of the roll core, said spacer ring being in abutting relation with said extension segment, said locking ring being fixedly secured to said extension segment by bolting and being in abutting relation with said spacer ring.

8. The apparatus of claim 1 wherein said helically wound mold tape is wound in overlapping fashion such that each subsequent winding overlaps the previous winding by a predetermined distance.

9. The apparatus of claim 8 wherein said predetermined distance is approximately 1.5 inches.

10. The apparatus of claim 1 wherein said spacer assembly additionally comprises a opening through which said polymeric filament may be extruded prior to applying said filament within said application zone and winding said filament over the roll core outer surface.

11. The apparatus of claim 1 wherein said mold tape includes a plurality of crimps to provide said mold tape with a radius of curvature.

12. The apparatus of claim 11 wherein said mold tape is approximately 0.005 inches in thickness.

13. The apparatus of claim 11 wherein said mold tape is formed of stainless steel.

14. The apparatus of claim 11 wherein said crimps are spaced apart from one another by a distance of approximately $9/16$ inches.

15. The apparatus of claim 11 wherein said plurality of crimps resembles the letter "V" in cross-section.

16. The apparatus of claim 15 wherein alternate crimps in said plurality resemble an minverted letter "V" in cross-section.

17. The apparatus of claim 1 wherein said mold tape is secured to said spacer assembly by taping thereto with adhesive tape.

18. The apparatus of claim 1 wherein said apparatus additionally comprises a motor and gear reduction assembly located on said base portion and below the turntable, said motor and gear assembly being drivingly connected to said turntable for rotating said turntable on said base portion.

19. The apparatus of claim 1 wherein said turntable is seated over a circular opening over said base portion, said apparatus additionally comprising a ball bearing assembly disposed between the bottom surface of said turntable and the top surface of said base portion, said ball bearing assembly enabling rotational movement of said turntable while seated within said circular opening.

20. The apparatus of claim 1 wherein said aligned chucks are universal type chucks.

21. The apparatus of claim 1 wherein said slidably mounted spacer assembly additionally comprises a sidewall having a bore, said apparatus additionally comprising a pin indexing device mounted on said turntable, said device comprising a pin aligned with said bore, said device being arranged for indexing said pin from a retracted position wherein said pin is removed from said sidewall bore to an extended position wherein said pin is inserted within said bore, said spacer assembly remaining non-rotatable during turntable rotation when said pin is in said retracted position, said spacer assembly slidably rotating with said turntable when said pin is in said extended position.

22. The apparatus of claim 1 wherein said motor driven elevator assembly comprises an electric motor assembly drivingly connected to a plurality of vertically oriented ball screw shafts, said platform assembly further comprising a plurality of internally threaded moveable elements arranged to be disposed over each said ball screw shaft, each said moveable element being vertically moveable in response to rotational movement of its associated shaft, said motor being arranged for causing simultaneous rotary movement of said shafts thus enabling vertical movement of said platform assembly.

23. The apparatus of claim 22 wherein said side members are of sufficient height that when said roll core is in said elevated start position, the roll core is oriented vertically with its bottom end positioned proximate the level of said feeding head of said extruder.

24. The apparatus of claim 23 wherein said side members are approximately forty feet in height.

25. The apparatus of claim 23 additionally comprising a large opening extending from ground level therebelow, said opening having a vertical wall and being sufficiently deep that when the roll core is in said lowered finish position, said roll core is oriented vertically with its top end positioned proximate ground level and its bottom end extending downwardly into said large opening.

26. The apparatus of claim 25 wherein said large opening is approximately forty feet in depth below ground level.

27. The apparatus of claim 25 wherein said motor driven elevator assembly is located within said opening.

28. The apparatus of claim 27 wherein each said vertically oriented shaft comprises a top end that is secured to said base portion in a manner that enables rotational movement of said shaft, each said shaft being suspended therefrom and extending into said opening, each said shaft also comprising a free end opposite said top end.

29. The apparatus of claim 28 wherein said apparatus additionally comprises an I-beam assembly, said I-beam assembly comprising a central portion and a plurality of arms extending radially therefrom, each arm having a distal end, said plurality of radially extending arms corresponding to the number of vertically oriented ball screw shafts, said electric motor assembly being positioned within the central portion of said I-beam assembly and wherein the distal end of each said arm is connected to the free end of one of said vertically oriented ball screw shafts.

30. The apparatus of claim 29 wherein said electric motor assembly additionally comprises a drive sprocket disposed thereon and wherein each said vertically oriented ball screw shaft comprises a sprocket disposed thereon and wherein said driving connection between said electric motor assembly and each vertically oriented ball screw shaft comprises a continuous loop drive belt disposed over said drive sprocket and over said idler sprocket of said vertically oriented ball screw shaft.

31. The apparatus of claim 30 wherein said plurality of shafts comprises three shafts arranged in a triangular configuration and wherein said platform assembly is a generally triangular frame assembly having three corners, each corner being provided with a moveable element fixedly secured thereto, each moveable element being disposed over one of said three shafts and in threaded engagement therewith, and wherein said I-beam assembly comprises three arms extending radially at one-hundred and twenty degree intervals, the distal end of each said arm being connected to the free end of one of said shafts.

32. The apparatus of claim 31 wherein said idler sprocket disposed on each said vertically oriented shaft comprises a first idler sprocket located at the free end of said shaft, each said shaft additionally comprising a second idler sprocket located thereon, said apparatus additionally comprising a continuous loop safety chain being disposed over each said second idler sprocket.

33. The apparatus of claim 32 wherein said I-beam assembly additionally comprises safety chain tensioning means disposed thereon, said means abutting said safety chain and providing tension thereto.

34. The apparatus of claim 33 wherein said I-beam assembly additionally comprises drive belt tensioning means disposed thereon, said means abutting each said drive belt and providing tension thereto.

35. The apparatus of claim 34 additionally comprising at least one anchoring rod, said anchoring rod having a first end arranged for attachment to the distal end of an arm of said I-beam assembly and a second end for attachment to the vertical wall of said opening to reduce swinging and vibrations resulting during operation of the electric motor.

36. The apparatus of claim 35 additionally comprising a pair of opposed linear guide rails disposed vertically on the vertical wall of said large opening, said apparatus further comprising a linear bearing disposed over each said guide rail said linear bearing arranged for vertical sliding motion over the length of said guide rail, each said linear bearing being provided for attachment to said platform assembly to prevent rotational and lateral movement of said platform assembly during vertical movement.

37. The apparatus of claim 32 wherein each vertically oriented shaft additionally comprises a gear reducer assembly located thereon, said gear reducer being in communication with said first idler sprocket.

38. The apparatus of claim 37 wherein said gear reducer has a 50:1 gearing ratio.

39. The apparatus of claim 1 wherein said platform assembly additionally comprises a horizontal plate on which said upwardly facing chuck is mounted.

40. The apparatus of claim 1 wherein said heating element is an induction heater.

41. The apparatus of claim 35 wherein said at least one anchoring rod additionally comprises a threaded portion and a turnbuckle in threaded engagement therewith thus enabling tightening and loosening adjustment of said anchoring rod.

42. The apparatus of claim 41 wherein said at least one anchoring rod comprises two anchoring rods associated with each arm of said I-beam assembly, each rod being oriented tangentially with respect to the direction of rotational movement of said electric motor assembly to reduce swinging and vibrations resulting during operation of the electric motor.

43. The apparatus of claim 1 wherein said at least one extruder comprises at least a first extruder and a second extruder, said extruders converging at a common feeding head.

* * * * *